Oct. 29, 1935.　　　F. C. LEONARD　　　2,019,144
THERMOSTATIC CONTROL MECHANISM
Filed May 21, 1932　　　2 Sheets-Sheet 1

Inventor
Frederick C. Leonard
By Nathaniel Frucht
his Attorney

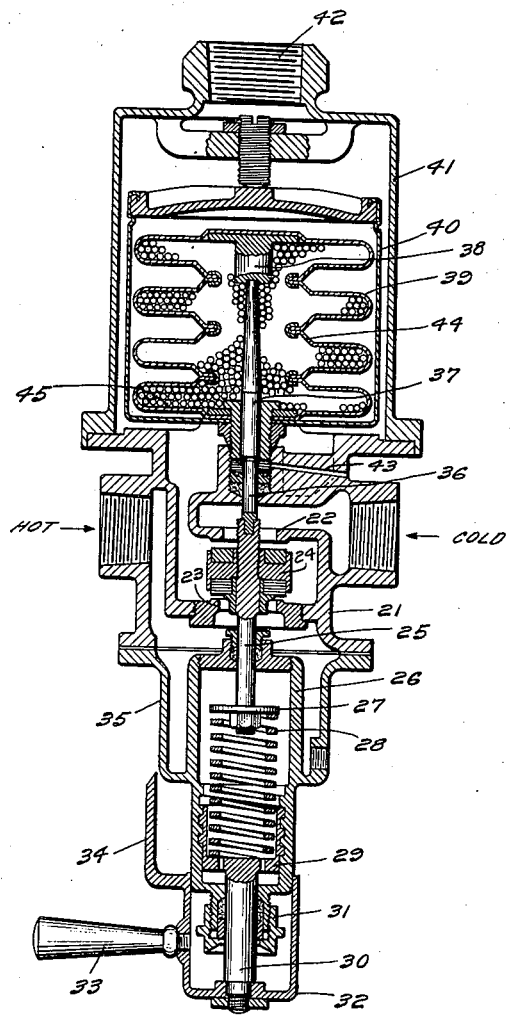

Patented Oct. 29, 1935

2,019,144

UNITED STATES PATENT OFFICE 2,019,144

THERMOSTATIC CONTROL MECHANISM

Frederick C. Leonard, Cranston, R. I.

Application May 21, 1932, Serial No. 612,759

9 Claims. (Cl. 236—12)

My present invention relates to thermostatically operated control devices, and has particular reference to control devices comprising a movable bellows actuated by the expansion and contraction of a fluid in response to temperature variations.

It is common to employ thermostatic devices of the bellows type for operating mechanism such as winter fronts for automobiles, and valve controls for showers, tubs, and the like, the bellows arrangement being simple to manufacture and assemble. One serious difficulty attending the use of this type of thermostatic control has resided in the inability to secure accurate adjustment; this lack of accuracy is particularly noticeable in water mixing apparatus designed to continually supply water of a predetermined temperature, and particularly water mixing apparatus utilizing bellows type control mechanisms. The bellows of these mechanisms must be made of thin material such as sheet metal to obtain the desired flexibility, but the resilience of the metal forming the bellows permits both a stretch of the bellows sections and a general give of the bellows as a whole against the back pressure of the control mechanism, whereby movement of the bellows and shift of the control mechanism lags an appreciable time interval behind the change in temperature. This stretching of the material in response to increase in pressure of the thermostatic fluid is particularly noticeable in devices of the Bourdon type.

It is the principal object of my invention to devise a fluid thermostat bellows type construction in which stretch and give of the bellows material is eliminated, whereby the pressure of the thermostatic fluid is a direct pressure stress, with substantially no distortion stress; stretch of the bellows material is thus prevented, and the time lag is removed, ensuring exact correspondence between the change in temperature and the movement of the control mechanism.

In addition to the disadvantage of a time lag, bellows type control devices used for controlling the mixture of fluids of different temperatures, such as for example hot and cold water, have a further disadvantage in that variations in the entrance pressures of the two media exert an unbalanced force on the bellows and thus increase variation of the mechanism from a predetermined setting. It is a further object of my invention to provide a bellows type construction for controlling fluid mixture which is not affected by variations in entrance pressures of the different media.

The time lag and the effect of unbalanced or changing pressures on the bellows type apparatus have necessitated reduction in the movement of the operating control, in order to reduce the variation from a predetermined setting to a minimum. It is therefore an additional object of my invention to utilize operating mechanism in conjunction with the elimination of time lag and the effect of unbalanced pressures, that will produce a substantial increase in the control movement produced by the expansion of the bellows.

With the above and other objects and advantageous features in view, the invention consists in a novel method of operation and a novel bellows type construction more fully disclosed in the detailed description following, in conjunction with the accompanying drawings, and more specifically defined in the claims appended hereto.

In the drawings,

Fig. 1 is an elevation of a bellows type regulator of the improved construction, suitable for use in devices such as shutter controls and the like;

Fig. 3 is a vertical section through a bellows type regulator of the improved construction suitable for controlling the mixing of hot and cold fluids.

Figure 1:
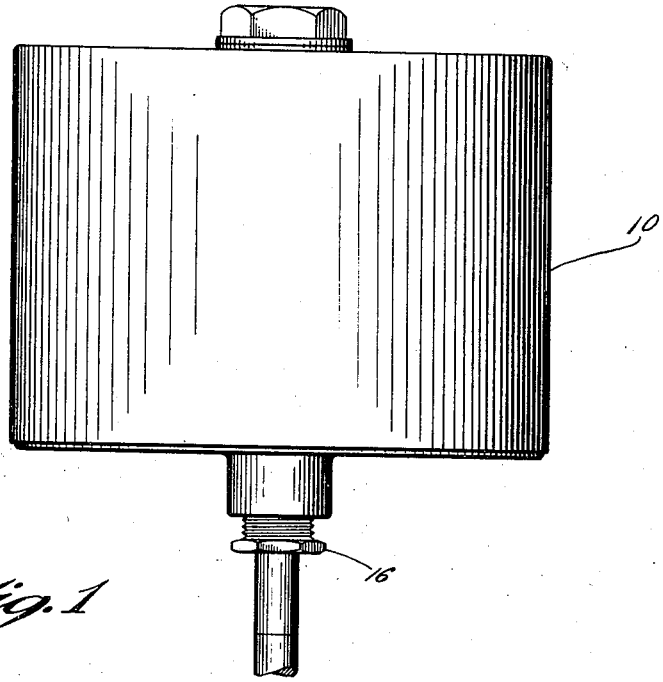
Figure 2:
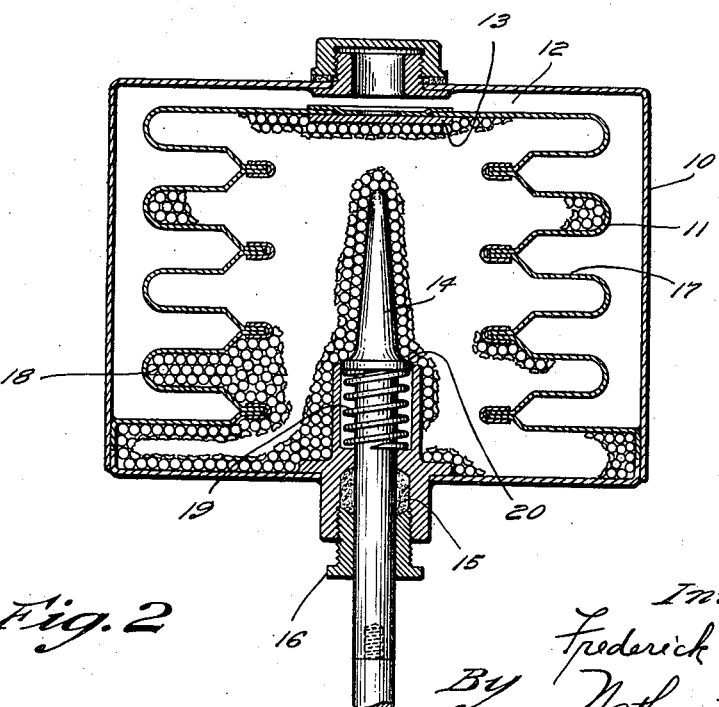
Fig. 2 is a vertical section thereof.

Referring to the drawings, a container 10 has a bellows 11 of usual thin sheet metal construction soldered therein to provide a sealed chamber 12 for receiving a thermostatic fluid such as gas or liquid of well-known thermal characteristics; the base of the bellows is provided with a closure element 13, and the end of an operating rod or plunger 14 is slidably journaled in a packing 15 of standard construction locked in a recess in the base of the container 10, as by a lock nut of standard type 16. The rod 14 may be used directly, or may be threaded or otherwise provided with connecting means to which an extension may be attached to operate the shutters, etc., in accordance with change in pressure of the thermostatic fluid, the extension being rigid or flexible as desired.

The bellows as shown consists of a number of inwardly extending sections 17, these sections forming the inner wall of the thermostatic chamber and the outer wall of the chamber surrounding the operating plunger 14, the space between the sections and the operating rod in the second chamber being completely filled with small steel balls 18, which may be packed in grease if desired. The balls are preferably selected as to their diameter so as to provide a rigid, manypoint support to the bellows sections whereby the entire space of the second chamber becomes of a substantially rigid nature which firmly supports the bellows sections but yields upon movement of the bellows and corresponding movement of the operating plunger 14.

Preferably, the operating plunger 14 is conical in form, whereby a slight movement of the bellows produces an elongated movement of the operating plunger and therefore of the control mechanism connected thereto.

It is therefore clear that change in volume of the thermostatic fluid within the chamber 12 causes a movement of the bellows as a whole and the sections in particular; but these sections are not free to expand or lengthen or to otherwise deform, whereby change in volume of the chamber 12 produces an immediate movement of operating plunger 14, without time lag, this movement being in exact proportion to change in volume of chamber 12. If desired, the return movement of the operating plunger 14 may be assisted by utilizing a spring such as indicated at 19, this spring abutting against the base of the container at one end, and against a washer or the like 20 at the other end, secured to the operating plunger 14 in suitable manner.

The essential feature of the invention is thus the provision of a rigid support for the bellows, which support is sufficiently yielding to permit movement of the bellows in response to expansion or contraction of the thermostatic fluid in the thermostatic chamber. While a liquid such as water or oil may be used instead of the steel balls disclosed in Fig. 1, packing around the plunger is required, and the cost of manufacture is higher; the steel balls are relatively inexpensive, are quickly assembled, have been found adequate for the desired support of the bellows sections against elongation and yielding movement, and require little or no packing or attention subsequent to installation. Control of the extent of movement of the valve may be readily obtained by variation of the slant of the plunger surface.

Referring now to Fig. 3, the same type of construction may be applied to mixing valves of the bellows controlled type. These mixing valves, in addition to the time lag and the inaccuracy resulting from expansion and yielding of the bellows material, are also affected by the reaction of unbalanced pressures of the two media to be mixed, upon the control mechanism and the bellows movement. Various attempts have been made to solve this problem, as for example by utilizing an auxiliary piston secured to the valve operating plunger and subjected to reverse pressure of the two media so as to balance the effect on the flow control valves, but these constructions have not proven effective compensation for the fluid pressure variations. The use of a fluid support medium for the bellows sections, however, overcomes this unbalancing effect, as the variations in pressure normally found in mixing devices of the character described are too light to produce any movement of a supported bellows.

In Fig. 3, the valve casing 21 has seats 22, 23 surrounding the cold and hot fluid inlet ports respectively. These ports are controlled by a single valve 24, carried on a stem 25, the lower portion of the stem projecting through the spring housing 26 and having a washer 27 keyed thereon against which one end of a compression spring 28 bears; the other end of the compression spring rests within a sleeve 29 threaded in the spring housing 26, to which a control stem 30 is attached. The stem is packed by means of the usual gland nut 31 and is secured at its lower end to a seating element 32 which has a handle 33 connected thereto, and also a pointer 34 which is coordinated with temperature indications disposed on the outer surface of the casting 35 in which the spring housing is mounted; the casting 35 is secured to and depends from the valve casing as shown.

At its upper end the valve stem 25 has connected thereto a short section 36, which abuts a plunger 37, the upper end of this plunger being in contact with a projection 38 depending from the inner wall of a flexible metallic bellows 39. The bellows is mounted within a rigid casing 40 to form a chamber for thermostatic fluid, and thermostatic liquid is positioned within the chamber and surrounds the bellows. The incoming hot and cold fluids thoroughly mix in the valve casing and pass between the casing 40 and an outer cover casing 41 to the outlet 42 at the upper end of the apparatus. Thus the bellows is not subjected to the external pressure of the fluid which passes therearound, and is effected solely by the temperature thereof. The section 36 of the stem is packed to provide a fluid tight joint, and a vent opening 43 in the valve casing serves to place the space above the packing in communication with the atmosphere, and provides a discharge for any liquid which escapes from the valve casing around the stem.

The device being suitably connected to sources of hot and cold fluids, and the spring 20 being properly compressed in order to counteract the expansive force exerted by the thermostatic liquid, the device will continue to function so as to vary the amount of hot and cold fluid in accordance with changes in temperature of the mixed fluid. Any variation of the entrance pressures of the respective fluids has no effect on the bellows operation, as the entire space between the bellows sections 44 and the plunger 37 is filled with small steel balls 45, which are preferably packed in grease, and which provide a yielding rigid support for the bellows sections whereby the bellows sections are supported against expansion and contraction and cannot give or yield but must move as a whole upon change in volume of the thermostatic liquid to produce an exactly corresponding movement of the plunger 37; the variation in pressure of the hot and cold fluids has no effect upon the bellows because of the rigid support afforded by the steel balls. Instead of the steel balls, fluid such as oil or water may be used, but the plunger chamber must be packed to avoid leakage.

The particular applications described show the use of a fluid support for the bellows sections, as the steel balls function as a "metal" fluid; the fluid support is yieldable upon change in volume of the thermostatic fluid and corresponding movement of the operating plunger, and eliminates time lag and local stretch of the thermostatic material and of the bellows as a whole, and in mixing valves local minor pressure variations which are transmitted back to the bellows have no effect on movement of the bellows in accordance with temperature changes. The effect of packing the free space between the bellows sections and operating plunger is to produce a bellows type thermostatic device which can only function upon expansion and contraction of the thermostatic fluid and in exact correspondence therewith.

Although the embodiments described are preferably provided with metal bellows, any bellows material such as rubber or the like may be utilized, as the construction prevents stretch or give of the bellows material. The bellows, moreover, may be of other design than the accordion type, as a bellows of star or corrugated form will operate satisfactorily.

While I have described specific structural embodiments of my invention, it is apparent that desired changes in the construction of the parts, in their proportion, and in their relative arrangements, may be made to suit the requirements for particular thermostatic installations, without departing from the spirit and the scope of the invention as defined in the appended claims.

I claim:

1. In a control apparatus, a casing, an expansible wall dividing said casing into two compartments, an expansible fluid in one compartment, a plunger extending through a wall of the other compartment and movable to change the volume of the other compartment, and a fluid medium of constant volume completely filling said other compartment.

2. In a control apparatus, a casing, an expansible wall dividing said casing into two compartments, an expansible fluid in one compartment, a plunger connected to said expansible wall and extending through a wall of the other compartment and movable to change the volume of the other compartment, and a fluid medium of constant volume completely filling said other compartment.

3. In a control apparatus, a casing, an expansible wall dividing said casing into two compartments, an expansible fluid in one compartment, a control device in the other compartment movable through one wall thereof, and incompressible fluid means completely filling said other compartment.

4. In a control apparatus, a casing, an expansible wall dividing said casing into two compartments, an expansible fluid in one compartment, a control device in the other compartment connected to said expansible wall and movable through one wall thereof, and incompressible fluid means completely filling said other compartment.

5. In a control apparatus, a casing, an expansible wall dividing said casing into two compartments, an expansible fluid in one compartment, a control device in the other compartment connected to said expansible wall and movable through one wall thereof, and steel balls of small diameter filling said other compartment.

6. In a thermostatic fluid mixer, a casing having inlet means for hot and cold fluids and an outlet for the mixed fluids, valve mechanism controlling the admission of fluids to said casing, a chamber for thermostatic fluid having an expansible wall and subjected to the temperature of the mixed fluids, a second chamber having a movable element operatively connected to said valve mechanism, said expansible wall also forming one wall of said second chamber, and incompressible fluid means filling said second chamber.

7. In a thermostatic fluid mixer, a casing having inlet means for hot and cold fluids and an outlet for the mixed fluids, valve mechanism controlling the admission of fluids to said casing, a chamber for thermostatic fluid having an expansible wall and subjected to the temperature of the mixed fluids, a second chamber having a movable element operatively connected to said valve mechanism, said expansible wall also forming one wall of said second chamber and said movable element being connected to said expansible wall, and incompressible fluid means filling said second chamber.

8. In a thermostatic fluid mixer, a casing having inlet means for hot and cold fluids and an outlet for the mixed fluids, valve mechanism controlling the admission of fluids to said casing, a chamber for thermostatic fluid having an expansible wall and subjected to the temperature of the mixed fluids, a second chamber having a movable element operatively connected to said valve mechanism, said expansible wall also forming one wall of said second chamber, and small steel balls filling said second chamber.

9. In a thermostatic fluid mixer, a casing having inlet means for hot and cold fluids and an outlet for the mixed fluids, valve mechanism controlling the admission of fluids to said casing, a chamber for thermostatic fluid having an expansible wall and subjected to the temperature of the mixed fluids, a second chamber having a movable element operatively connected to said valve mechanism, said expansible wall also forming one wall of said second chamber and said movable element being connected to said expansible wall, and small steel balls filling said second chamber.

FREDERICK C. LEONARD.